(12) United States Patent
Niikawa et al.

(10) Patent No.: US 10,107,362 B2
(45) Date of Patent: Oct. 23, 2018

(54) DRIVE TRANSMISSION MECHANISM AND IMAGE FORMING APPARATUS

(71) Applicant: CANON KABUSHIKI KAISHA, Tokyo (JP)

(72) Inventors: Yusuke Niikawa, Kawasaki (JP); Shoji Yamamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/668,917

(22) Filed: Aug. 4, 2017

(65) Prior Publication Data

US 2018/0038454 A1 Feb. 8, 2018

(30) Foreign Application Priority Data

Aug. 8, 2016 (JP) .................. 2016-155393

(51) Int. Cl.
| G03G 15/00 | (2006.01) |
| G03G 15/20 | (2006.01) |
| F16H 3/02 | (2006.01) |
| F16H 55/08 | (2006.01) |
| F16H 57/021 | (2012.01) |
| F16H 57/033 | (2012.01) |
| F16H 57/02 | (2012.01) |

(52) U.S. Cl.
CPC ............. *F16H 3/02* (2013.01); *F16H 55/08* (2013.01); *F16H 57/021* (2013.01); *F16H 57/033* (2013.01); *G03G 15/757* (2013.01); F16H 2055/0893 (2013.01); F16H 2057/02039 (2013.01)

(58) Field of Classification Search
CPC ............. G03G 15/757; G03G 15/2017; G03G 15/2053; F16H 3/02; F16H 55/08; F16H 57/021; F16H 57/033

USPC .................................. 399/167, 328
See application file for complete search history.

(56) References Cited

U.S. PATENT DOCUMENTS 8,534,151 B2 * 9/2013 Johnson et al. ........ F16D 11/10
  399/167
8,670,694 B2 * 3/2014 Nakura et al. ....... G03G 15/757
  399/167

FOREIGN PATENT DOCUMENTS

| JP | H104-194435 A | 7/1992 |
| JP | 2002-156005 A | 5/2002 |
| JP | 2004-198634 A | 7/2004 |

\* cited by examiner

*Primary Examiner* — William J Royer
(74) *Attorney, Agent, or Firm* — Fitzpatrick, Cella, Harper & Scinto

(57) ABSTRACT

A drive transmission mechanism includes a first gearbox including a driving source, a first gear train, a first frame configured to support one ends of a plurality of shafts of the first gear train, and a first gear cover configured to support the other ends of the shafts of the first gear train, wherein the first gear box is configured to transmit a driving force from the driving source; and a second gearbox including a second gear train, a second frame configured to support one ends of a plurality of shafts of the second gear train, and a second gear cover configured to support the other ends of the shafts of the second gear train, wherein the second gearbox is configured to receive the driving force from the driving source through the first gear train and configured to transmit the driving force. The second gearbox is fixed to the first gearbox.

20 Claims, 4 Drawing Sheets

DRIVE TRANSMISSION MECHANISM AND IMAGE FORMING APPARATUS

FIELD OF THE INVENTION AND RELATED ART

The present invention relates to a drive transmission mechanism using a plurality of gears and relates to an image forming apparatus including the drive transmission mechanism.

The image forming apparatus forms an electrostatic latent image by using a drum as an image bearing member and by applying an electrophotographic image forming process to the drum, so that an image is formed on a recording material (medium). For example, the image forming apparatus includes an electrophotographic copying machine, an electrophotographic printer (LED printer, laser beam printer or the like), an electrophotographic facsimile machine, and an electrophotographic word processor. The image forming apparatus further includes a monochromatic or full-color image forming apparatus used as a multi-function machine having functions of these machines or used as an output device such as a work station.

The recording material is a material on which the image is formed by the image forming apparatus and includes paper, an OHP sheet or the like, for example.

In the image forming apparatus, a plurality of gears are used as a drive transmission means. A driving force is transmitted from a driving source such as a motor to the drum or a sheet feeding roller via the gears. When the number and the size of these gears increase, areas of a frame of a gearbox and a cover increase and constitute a cause of a lowering in rigidity and an increase in a size of a main body.

As a means for solving the problem, for example, Japanese Laid-Open Patent Application 2004-198634 discloses a constitution. In this constitution, a plurality of gears are divided and accommodated in two gearboxes, and drive transmission between the two gearboxes is carried out by adding a connecting member including the gears, a frame and a coupling for drive transmission. Further, the two gearboxes are disposed in an overlapping manner, so that the two gearboxes can be disposed in a space-saving manner.

However, in the above constitution, there arises a problem that the number of parts increases due to addition of the connecting member and that the constitution becomes completed. Further, a constitution in which a cover of a main gearbox also functions as a frame of the other gearbox is employed. For that reason, there is a problem such that by deformation of the cover of the main gearbox during drive, accuracy (a center distance of the accommodated gears, an inclination of the connecting member, or the like) in an inside of the other gearbox is worsened.

SUMMARY OF THE INVENTION

A principal object of the present invention is to provide a drive transmission mechanism and an image forming apparatus which are capable of ensuring, irrespective of deformation of a cover of a main gearbox during drive, accuracy to the other gearbox with a simple constitution.

According to an aspect of the present invention, there is provided a drive transmission mechanism comprising: a first gearbox including a driving source, a first gear train, a first frame configured to support one ends of a plurality of shafts of the first gear train, and a first gear cover configured to support the other ends of the shafts of the first gear train, wherein the first gear box is configured to transmit a driving force from the driving source; and a second gearbox including a second gear train, a second frame configured to support one ends of a plurality of shafts of the second gear train, and a second gear cover configured to support the other ends of the shafts of the second gear train, wherein the second gearbox is configured to receive the driving force from the driving source through the first gear train of the first gearbox and configured to transmit the driving force, wherein the second gearbox is fixed to the first gearbox.

According to another aspect of the present invention, there is provided an image forming apparatus for forming a toner image on a recording material, comprising: a photosensitive member configured to carry the toner image to be transferred onto the recording material; a roller rotatable normally and reversely in order to switch a feeding direction of the recording material on which the toner image is formed and configured to feed the recording material; a first gearbox including a driving source, a plurality of gears, a first frame configured to support one ends of shafts of the plurality of gears, and a first gear cover configured to support other ends of the shafts of the plurality of gears, wherein the first gear box is configured to transmit a driving force from the driving source to the photosensitive member to drive the photosensitive member; and a second gearbox including a plurality of gears, a second frame configured to support one ends of shafts of the plurality of gears, and a second gear cover configured to support other ends of the shafts of the plurality of gears, wherein the second gearbox is configured to transmit the driving force from the driving source through the plurality of gears of the first gearbox to the roller thereby to drive the roller, wherein the second gearbox is fixed to the first gearbox.

Further features of the present invention will become apparent from the following description of exemplary embodiments with reference to the attached drawings.

DESCRIPTION OF EMBODIMENTS

Embodiments of the present invention will be specifically described with reference to the drawings. Dimensions, materials, shapes and relative arrangements of constituent elements described in the following embodiments should be appropriately be changed depending on structures and various conditions of mechanisms (apparatuses) to which the present invention is applied. Accordingly, the scope of the present invention is not intended to be limited to the following embodiments.

Embodiment 1

(Laser Beam Printer)

Figure 1:
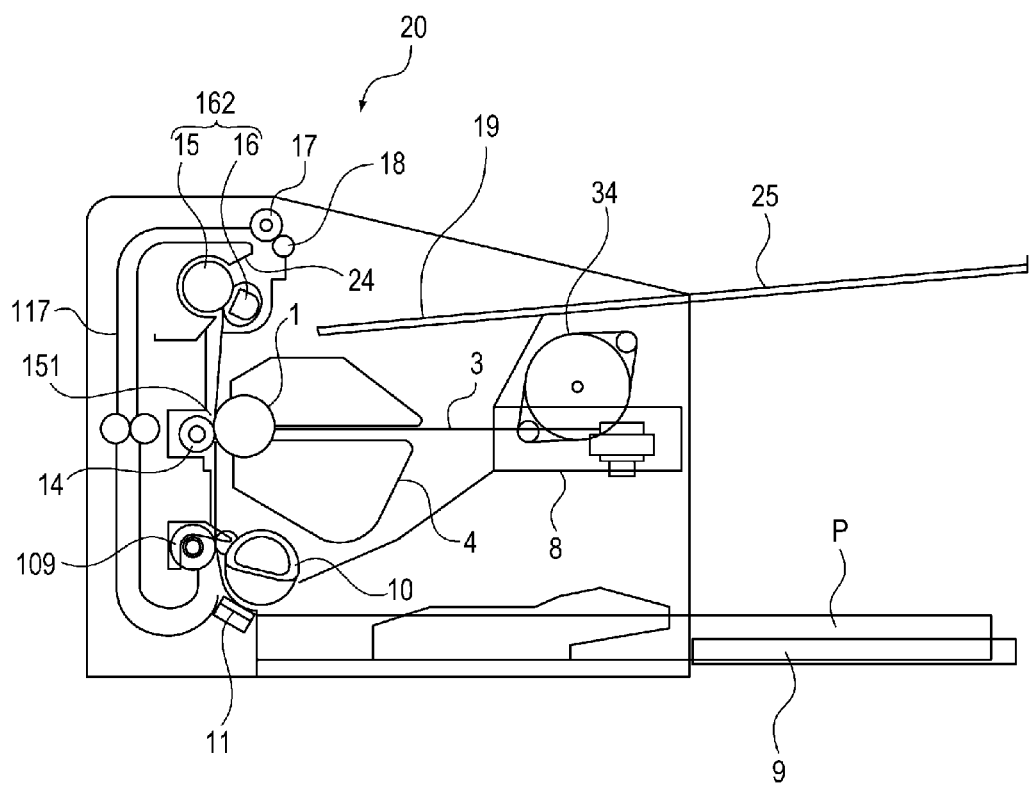
FIG. 1 is a sectional view showing a structure of an image forming apparatus according to Embodiment 1.

With reference to FIG. 1, a general structure of an image forming apparatus 20 according to Embodiment 1 of the present invention will be described. In this embodiment, as the image forming apparatus, particularly a laser beam printer of an electrophotographic type will be described as an example.

On the basis of a print signal from a host computer (not shown), drive (driving force) from a motor 34 is transmitted, so that a sheet (paper) feeding roller 10 is rotated. A recording material (medium) P stacked on a sheet feeding tray 9 is separated one by one by the sheet feeding roller 10 and a sheet separating means 11. The separated recording material P is fed to a transfer portion 151 by a feeding roller pair 109. The transfer portion 151 is formed by a transfer roller 14 and a process cartridge 4 detachably mountable to the image forming apparatus 20. The process cartridge 4 is constituted by a photosensitive drum 1, a charging means for electrically charging the photosensitive drum 1, a developing means for developing a latent image on the photosensitive drum 1 with toner, and the like.

A laser scanner unit 8 emits laser light 3. The surface of the photosensitive drum 1 is exposed to this laser light 3, so that the latent image is formed on the photosensitive drum 1. This latent image is developed with toner as a developer by the developing means, so that a toner image is formed on the photosensitive drum 1. The toner image formed on the photosensitive drum 1 is transferred by the transfer roller 14 onto the recording material P fed toward the transfer portion 151. The recording material P to which the transfer of the toner image is ended is fed to a fixing unit 162 constituted by a fixing heater 16 and a pressing roller 15 press-contacted to the fixing heater 16, in which the transferred toner image is heated and fixed on a first (front) surface of the recording material P.

The recording material P on which the image fixing is ended is fed toward a discharge nip, along a feeding guide 24, formed by a sheet discharge driving roller 17 and a sheet discharge follower roller 18. The sheet discharge driving roller 17 and the sheet discharge follower roller 18 discharge the recording material P to an outside of the image forming apparatus 20, so that the recording material P is stacked on a sheet discharge tray 19 and a sheet discharge extension tray 25.

On the other hand, in the case of double-side (surface) printing in which images are formed on both surfaces (front and back surfaces) of the recording material P, when the recording material P passes through the fixing unit 162, an unshown sensor (detecting means) provided in the fixing unit 162 detects a trailing end of the sheet (recording material P). When a detection signal of the sensor is received by an unshown controller (control means), the controller sends a roller reversing signal to the sheet discharge driving roller 17. Then, rotation of the sheet discharge driving roller 17 is reversed, so that the recording material P is fed to a feeding path 117 for double-side printing and then is fed to the feeding roller pair 109.

At this time, the recording material P is turned upside down, and thereafter is subjected to the same process as that in the above-described one-side (surface) printing, so that the image is printed (formed) on a second (back) surface of the recording material P.

(Gearbox)

Figure 2:
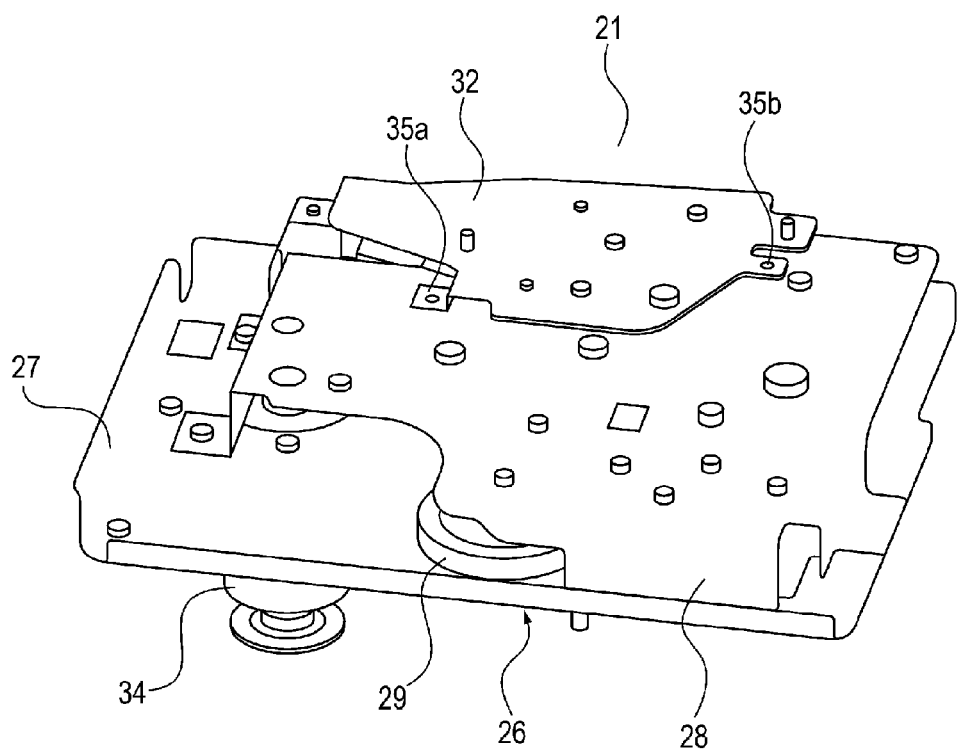
FIG. 2 is a perspective view showing a drive constitution of the image forming apparatus in Embodiment 1.
Figure 3:
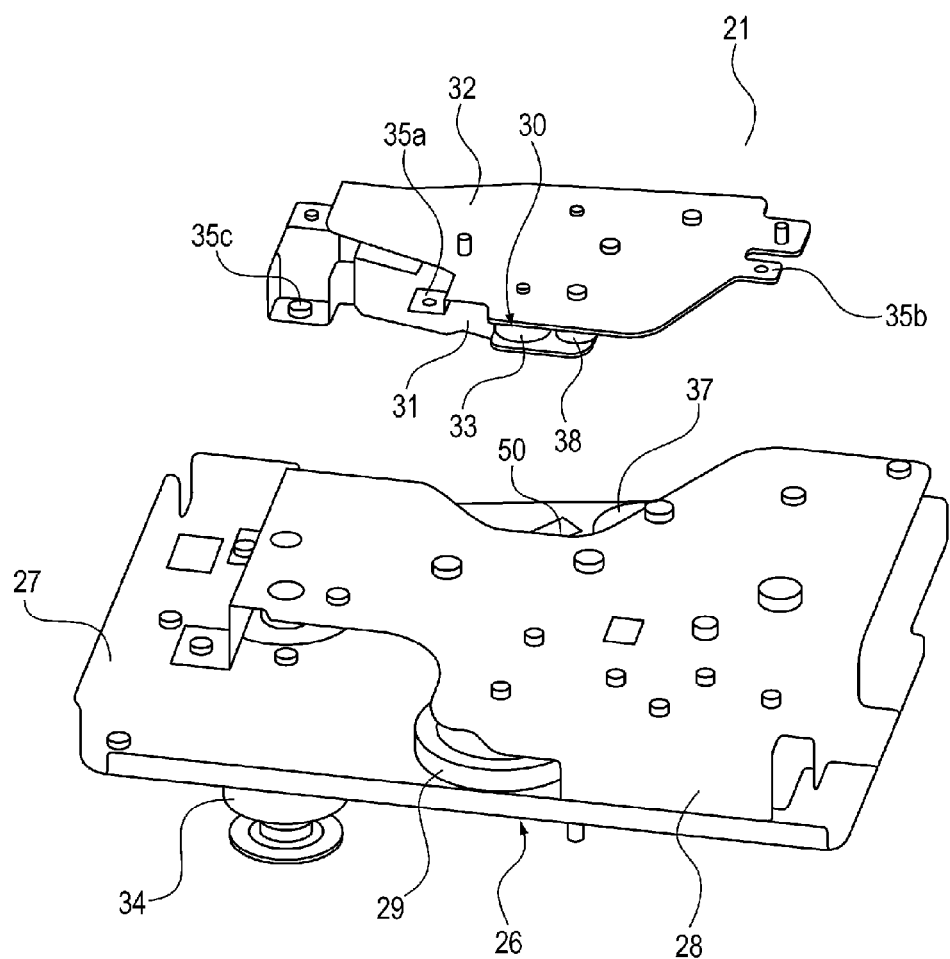
FIG. 3 is an exploded perspective view showing the drive constitution of the image forming apparatus in Embodiment 1.

The image forming apparatus 20 in this embodiment includes a drive transmission mechanism 21 as shown in FIGS. 2 and 3. A first gearbox 26 rotatably supports both ends of shafts of a plurality of gears constituting a first gear train 29 by a first frame 27 and a first gear cover 28 as shown in FIG. 2. The first frame 27 rotatably supports one ends of the shafts of the gears of the first gear train 29, and the first gear cover 28 rotatably supports other ends of the gears of the first gear train 29. Similarly, also a second gearbox 30 rotatably supports both ends of shafts of a plurality of gears constituting a second gear train 33 by a second frame 31 and a second gear cover 32 as shown in FIG. 3. The second frame 31 rotatably supports one ends of the shafts of the gears of the second gear train 33, and the second gear cover 32 rotatably supports other ends of the gears of the second gear train 33.

The second gearbox 30 is detachably supported by the first gearbox 26. The second gear cover 32 is fastened to the first gear cover 28 with screws at two fastening portions 35a and 35b. Further, the first frame 27 and the second frame 31 are fastened to each other with a screw at a fastening portion 35c. In this embodiment, a constitution in which the second gearbox 30 is fastened to the first gear cover 28 of the first gearbox 26 with the screws at the two portions was described as an example, but the present invention is not limited thereto. The second gearbox 30 may only be required to be fastened at two or more portions (at least two portions). Thus, the second gearbox 30 is fixed to the first gearbox 26.

Figure 4:
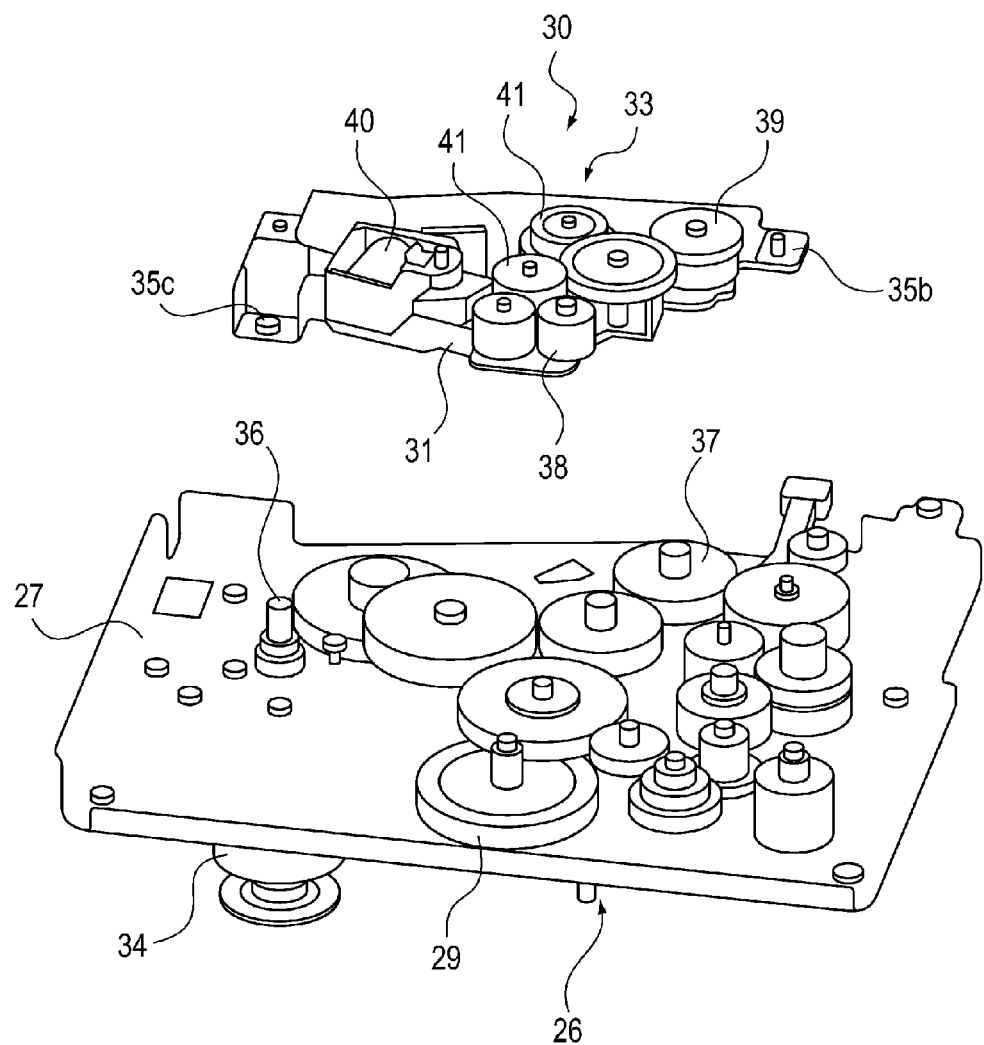
FIG. 4 is an exploded perspective view of first and second gearboxes of the image forming apparatus in Embodiment 1.

The first gear train 29 of the first gearbox 26 includes the motor 34 which is a driving source as shown in FIG. 4 and transmits the driving force from the motor 34. The first gear train 29 drives rotatable members (the sheet feeding roller 10, the feeding roller pair 109 and the process cartridge 4 (exactly the photosensitive drum 1), the transfer roller 14, the fixing unit 162 and the like), of the above-described laser beam printer, other than the sheet discharge driving roller 17. The first gear train 29 includes a drive transmission gear 37 for transmitting the drive (driving force) to the second gear train 33. The first gear train 29 is connected from a gear pinion 36 of the motor 34 to the drive transmission gear 37 via a plurality of gears.

The second gear train 33 of the second gearbox 30 receives the driving force from the first gear train 29. The second gear train 33 includes a driven transmission gear 38 for receiving the drive (driving force) from the drive transmission gear 37 of the first gear train 29, a reverse driving mechanism for switching between normal rotation and reverse rotation of the sheet discharge driving roller 17, and an output gear 39 for driving the sheet discharge driving roller 17. Further, the second gear train 33 is connected from the driven transmission gear 38 to the output gear 39 via the reverse driving mechanism.

The second gear train 33 is not provided with the driving source, and as described above, the drive (driving force) is transmitted from the first gear train 29 to the second gear train 33 by engagement of the driven transmission gear 38 with the drive transmission gear 37 of the first gear train 29. For that reason, as regards drive (driving force) transmission between units of the first gearbox 26 and the second gearbox 30, an additional constituent part is not needed, so that a simple driving train can be constituted.

The driven transmission gear 38 rotates in a certain direction and switches rotation of the output gear 39 between normal rotation and reverse rotation by the reverse driving mechanism. The reverse driving mechanism is constituted by a solenoid 40 which is an actuator and by two planetary gear trains 41. The reverse driving mechanism constituted by the solenoid 40 and the two planetary gear trains 41 has a widely used constitution, and therefore, will be omitted from detailed description.

The first gear train 29 drives the fixing unit 162, the process cartridge 4 and the like as described above, but these members needs a large torque. For that reason, by a reaction force of the driving force, the first gear cover 28 holding (supporting) the first gear train 29 is deformed in a small amount. As a result, the first gear train 29 changes in center distance and alignment of gears. The first gear train 29 is designed so as to allow the change in center distance and alignment of the gears due to the deformation of the first gear cover 28.

On the other hand, the second gear train 33 includes the reverse driving mechanism constituted by the solenoid 40 and the planetary gear train 41. In order to stably operate the planetary gear train 41, there is a need to ensure the center distance and the alignment of the planetary gear train 41 with accuracy.

Therefore, in this embodiment, the second gear train 33 of the second gearbox 30 supports both ends of shafts of the respective gears by the second frame 31 and the second gear cover 32 which are separate members from those of the first gearbox 26. For that reason, irrespective of the deformation of the first gear cover 28 during the drive, it becomes possible to ensure the center distance and the alignment of the planetary gear train 41, provided inside the second gear train 33, with high accuracy.

The second gear cover 32 of the second gearbox 30 is mounted to the first gear cover 28 of the first gearbox 26. For that reason, it is possible to ensure engagement accuracy between the drive transmission gear 37 of the first gear train 29 and the driven transmission gear 38 of the second gear train 33.

As described above, the accuracy of the second gear train 33 can be ensured, so that it becomes possible to use a small module gear of not more than 0.6 in module. For that reason, downsizing of the second gearbox 30 by downsizing of the respective gears, and high-speed rotation of the gears can be realized. As a result, when drive switching of the reverse driving mechanism is made, it becomes possible to suppress a time lag to a small level. Here, the module refers to a numerical value obtained by dividing a pitch circle diameter (D) of the gear by number of teeth (Z) (module M=D/Z), and roughly represents a size of the gear.

At a connecting portion between units, such as at a periphery of an engaging portion between the drive transmission gear 37 and driven transmission gear 38, interference with a mating unit is avoided frequently by partly depressing the first gear cover 28. In this embodiment, the second gearbox 30 is fastened with screws at the two fastening portions 35a and 35b so as to extend over a recessed portion (cut-away portion) 50 of the first gear cover 28. For that reason, the first gear cover 28 can be effectively reinforced. As a result, it is possible to suppress the deformation of the first gear cover 28 during the drive.

In the above, the image forming apparatus 20 for carrying out the double-side printing was described. In the image forming apparatus exclusively for the one-side printing, there is no need to use the above-described reverse driving mechanism. Therefore, the second gear train of the image forming apparatus for the one-side printing does not include the reverse driving mechanism and employs a constitution in which the drive (driving force) is transmitted from the driven transmission gear 38 to the output gear 39 via an idler gear. The thus-constituted second gearbox for the one-side printing is mounted to the first gear cover 28. The driven transmission gear 38 rotating in a certain direction rotates the output gear 39 in the above-described certain direction through the idler gear. As a result, the sheet discharge driving roller 17 is normally rotated, so that the recording material P is discharged to the outside of the image forming apparatus 20.

As described above, drive trains of a plurality of kinds can be constituted by preparing second gearboxes of a plurality of kinds different in constitution (in this embodiment, second gearboxes of a plurality of kinds for the double-side printing and the one-side printing are prepared). As a result, products of a plurality of kinds can be easily prepared selectively.

Other Embodiments

In the above-described embodiments, a monochromatic image forming apparatus using a single process cartridge was described as an example, but the present invention is not limited thereto. The present invention is also applicable to a full-color image forming apparatus using a plurality of process cartridges.

Further, in the above-described embodiments, as the image forming apparatus, the printer was described as the example, but the present invention is not limited thereto. For example, the image forming apparatus may also be other image forming apparatuses such as a copying machine, a facsimile machine, and a multi-function machine having a combination of functions of these machines. A similar effect can be obtained by applying the present invention to drive transmission mechanisms used in these image forming apparatuses.

According to the present invention, the gears provided inside the second gearbox is supported by the frame and the gear cover which are separate members from those of the first gearbox. Further, the second gearbox is mounted to the gear cover of the first gearbox. For that reason, irrespective of the deformation of the first gearbox during the drive, accuracy of the inside of the second gearbox can be ensured with a simple constitution.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-155393 filed on Aug. 8, 2016, which is hereby incorporated by reference herein in its entirety.

What is claimed is:

1. A drive transmission mechanism comprising:
a first gearbox including (i) a driving source, (ii) a first gear train having a plurality of shafts, (iii) a first frame configured to support one end of each of said plurality of shafts of said first gear train, and (iv) a first gear cover configured to support the other end of each of said plurality of shafts of said first gear train, wherein said first gear box is configured to transmit a driving force from said driving source; and
a second gearbox fixed to said first gearbox and including (i) a second gear train having a plurality of shafts, (ii) a second frame configured to support one end of each of said plurality of shafts of said second gear train, and (iii) a second gear cover configured to support the other end of each of said plurality of shafts of said second gear train, wherein said second gearbox is configured to receive the driving force from said driving source through said first gear train of said first gearbox and configured to transmit the driving force.

2. A drive transmission mechanism according to claim 1, wherein said second frame is fixed to said first frame, and said second gear cover is fixed to said first gear cover.

3. A drive transmission mechanism according to claim 2, wherein said second gear cover of said second gearbox is fastened to said first gear cover of said first gearbox in at least two positions.

4. A drive transmission mechanism according to claim 3, wherein said first gear cover of said first gearbox includes a cut-away portion configured to avoid interference with said second gearbox, and
wherein said second gear cover of said second gearbox is fastened to said first gear cover of said first gearbox in two positions so as to extend over the cut-away portion.

5. A drive transmission mechanism according to claim 1, wherein said second gearbox includes an output gear and a reverse driving mechanism for switching between normal rotation and reverse rotation of said output gear.

6. A drive transmission mechanism according to claim 1, wherein said second gearbox includes a gear having a module of 0.6 or less.

7. A drive transmission mechanism according to claim 1, wherein said second gearbox includes a planetary gear train.

8. An image forming apparatus for forming a toner image on a recording material, the image forming apparatus comprising:
a photosensitive member configured to carry the toner image to be transferred onto the recording material;
a roller rotatable normally and reversely in order to switch a feeding direction of the recording material on which the toner image is formed and configured to feed the recording material;
a first gearbox including (i) a driving source, (ii) a plurality of gears supported by a plurality of shafts, (iii) a first frame configured to support one end of each shaft of the plurality of shafts, and (iv) a first gear cover configured to support other end of each shaft of the plurality of shafts, wherein said first gear box is configured to transmit a driving force from said driving source to said photosensitive member to drive said photosensitive member; and
a second gearbox fixed to said first gearbox and including (i) a plurality of gears supported by a plurality of shafts, (ii) a second frame configured to support one end of each shaft of said plurality of shafts, and (iii) a second gear cover configured to support other end of each shaft of said plurality of shafts, wherein said second gearbox is configured to transmit the driving force from said driving source through said plurality of gears of said first gearbox to said roller thereby to drive said roller.

9. An image forming apparatus according to claim 8, wherein said second frame is fixed to said first frame, and said second gear cover is fixed to said first gear cover.

10. An image forming apparatus according to claim 9, wherein said second gear cover of said second gearbox is fastened to said first gear cover of said first gearbox in at least two positions.

11. An image forming apparatus according to claim 10, wherein said first gear cover of said first gearbox includes a cut-away portion configured to avoid interference with said second gearbox, and
wherein said second gear cover of said second gearbox is fastened to said first gear cover of said first gearbox in two positions so as to extend over the cut-away portion.

12. An image forming apparatus according to claim 8, wherein said second gearbox includes an output gear and a reverse driving mechanism for switching between normal rotation and reverse rotation of said output gear.

13. An image forming apparatus according to claim 8, wherein said second gearbox includes a gear having a module of 0.6 or less.

14. An image forming apparatus according to claim 8, wherein said second gearbox includes a planetary gear train.

15. An image forming apparatus for forming a toner image on a recording material, the image forming apparatus comprising:
a fixing unit configured to fix the toner image formed on the recording material onto the recording material, said fixing unit includes a first roller configured to feed the recording material;
a second roller rotatable normally and reversely in order to switch a feeding direction of the recording material through which said fixing unit passing;
a driving source;
a first gearbox including a plurality of gears, wherein said first gearbox is configured to transmit a driving force from said driving source to said first roller to drive said first roller; and
a second gearbox fixed to said first gearbox and including a plurality of gears, wherein said second gearbox is configured to transmit the driving force from said driving source through said plurality of gears of said first gearbox to said second roller thereby to drive said second roller.

16. An image forming apparatus according to claim 15, wherein said driving source is mounted on said first gearbox.

17. An image forming apparatus according to claim 15, wherein said second gearbox includes a planetary gear train.

18. An image forming apparatus according to claim 15, wherein said first gearbox includes (i) a plurality of shafts supporting said plurality of gears of said first gearbox, (ii) a first frame configured to support one end of each shaft of said plurality of shafts and (iii) a first gear cover configured to support other end of each shaft of said plurality of shafts,
wherein said second gearbox includes (i) a plurality of shafts supporting said plurality of gears of said first gearbox, (ii) a second frame configured to support one end of each shaft of said plurality of shafts, and (iii) a second gear cover configured to support other end of each shaft of said plurality of shafts, and
wherein said second frame is fixed to said first frame, and said second gear cover is fixed to said first gear cover.

19. An image forming apparatus according to claim 15, wherein said second gearbox includes an output gear and a reverse driving mechanism for switching between normal rotation and reverse rotation of said output gear.

20. An image forming apparatus according to claim 15, wherein said second gearbox includes a gear having a module of 0.6 or less.

* * * * *